(12) United States Patent　　　(10) Patent No.:　US 12,701,022 B2
　　Hua　　　　　　　　　　　　　　　(45) Date of Patent:　　　Aug. 4, 2026

(54) POWER OVER ETHERNET SYSTEM, RELATED METHOD AND RELATED APPARATUS

(71) Applicant: SUZHOU METABRAIN INTELLIGENT TECHNOLOGY CO., LTD., Suzhou (CN)

(72) Inventor: Deyang Hua, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/723,154

(22) PCT Filed: Dec. 9, 2022

(86) PCT No.: PCT/CN2022/137912
　　§ 371 (c)(1),
　　(2) Date: Jun. 21, 2024

(87) PCT Pub. No.: WO2024/021434
　　PCT Pub. Date: Feb. 1, 2024

(65) Prior Publication Data
　　US 2025/0150293 A1　　May 8, 2025

(30) Foreign Application Priority Data

Jul. 29, 2022　(CN) .......................... 202210909148.1

(51) Int. Cl.
　　*H04L 12/10*　　　　(2006.01)
(52) U.S. Cl.
　　CPC .................................... *H04L 12/10* (2013.01)
(58) Field of Classification Search
　　CPC ........ H04B 2203/54; H04B 2203/5404; H04B 2203/5408; H04B 2203/5429;
　　　　　　　(Continued)

(56) References Cited

U.S. PATENT DOCUMENTS 7,620,846 B2 * 11/2009 Biederman ............. H04L 12/10
　　　　　　　　　　　　　　　　　　　　　714/14
7,836,336 B2 * 11/2010 Biederman ............. H04L 12/10
　　　　　　　　　　　　　　　　　　　　　714/14
(Continued)

FOREIGN PATENT DOCUMENTS

CN　　　　107517107 A　　12/2017
CN　　　　107566130 A　　1/2018
(Continued)

OTHER PUBLICATIONS

International Search Report and Written Opinion received for PCT Serial No. PCT/CN2022/137912 on Apr. 27, 2023, 9 pgs.
(Continued)

*Primary Examiner* — James M Perez
(74) *Attorney, Agent, or Firm* — Merchant & Gould P.C.

(57) ABSTRACT

The present disclosure discloses a power over Ethernet system, including: at least one network port module, configured to achieve power over Ethernet or receive electric energy provided by Ethernet; a power supply module, configured to acquire the electric energy; a power consumption module, configured to act as a load component using the electric energy; and at least one integrated power supply and power receiving module, configured to supply power to the network port module by the electric energy acquired from the power supply module when in a power supply mode, and supply power to the power assumption module by the electric energy acquired from the network port module when in a power receiving mode. The present disclosure reduces the cost of the PoE system, and improves the integration level of a device.

16 Claims, 5 Drawing Sheets

(58) Field of Classification Search

CPC ...... H04B 2203/545; H04B 2203/5462; H04B 2203/547; H04B 2203/5483; H04B 2203/5487; H04B 2203/5491; H04B 3/54; H04B 3/548; H04B 3/56; H04L 12/00; H04L 12/02; H04L 12/10; H04L 25/00; H04L 25/02; H04L 25/026

See application file for complete search history.

(56) References Cited

U.S. PATENT DOCUMENTS

| | | | | |
|---|---|---|---|---|
| 9,590,526 | B2 * | 3/2017 | Adest | G01S 3/7861 |
| 10,666,447 | B2 * | 5/2020 | He | H04L 12/40045 |
| 11,025,443 | B2 * | 6/2021 | He | G06F 1/26 |
| 11,689,377 | B2 * | 6/2023 | Zou | G06F 1/3278 713/300 |
| 11,750,407 | B2 * | 9/2023 | Synstelien | H04L 12/10 375/257 |
| 12,231,249 | B2 * | 2/2025 | Fu | G06F 1/266 |
| 12,244,237 | B2 * | 3/2025 | Hua | H04L 12/10 |
| 12,277,023 | B1 * | 4/2025 | Li | G06F 1/30 |
| 12,282,369 | B1 * | 4/2025 | Chen | H04L 67/01 |
| 12,348,026 | B1 * | 7/2025 | Wang | H02H 7/20 |
| 12,355,276 | B2 * | 7/2025 | Wang | H02J 7/50 |
| 12,445,317 | B2 * | 10/2025 | Synstelien | H04L 12/10 |
| 2005/0086546 | A1 * | 4/2005 | Darshan | G06F 1/3209 700/286 |
| 2006/0080573 | A1 * | 4/2006 | Biederman | H04L 12/10 714/11 |
| 2006/0089230 | A1 * | 4/2006 | Biederman | H04L 12/10 477/34 |
| 2007/0085675 | A1 * | 4/2007 | Darshan | H04L 12/10 307/3 |
| 2008/0294918 | A1 * | 11/2008 | Dhuyvetter | H04L 12/10 713/310 |
| 2009/0001956 | A1 * | 1/2009 | Velez | H04L 12/10 323/304 |
| 2010/0037093 | A1 * | 2/2010 | Biederman | H04L 12/10 714/14 |
| 2016/0064938 | A1 * | 3/2016 | Balasubramanian | H04L 12/10 307/11 |
| 2016/0301208 | A1 * | 10/2016 | Lin | H04L 12/10 |
| 2016/0380777 | A1 * | 12/2016 | Sipes, Jr. | H04B 10/40 307/1 |
| 2017/0229861 | A1 * | 8/2017 | Kawamoto | H02J 1/10 |
| 2017/0250828 | A1 * | 8/2017 | Buchanan | H02J 3/02 |
| 2018/0076714 | A1 * | 3/2018 | Ono | H02M 3/33507 |
| 2018/0109391 | A1 * | 4/2018 | He | H04L 12/10 |
| 2018/0131182 | A1 * | 5/2018 | Vavilala | H04L 12/10 |
| 2019/0280895 | A1 * | 9/2019 | Mather | H04L 12/40045 |
| 2020/0295956 | A1 * | 9/2020 | He | G05B 7/02 |
| 2022/0021548 | A1 * | 1/2022 | Goergen | G06F 1/3212 |
| 2022/0102946 | A1 * | 3/2022 | Craft, Jr. | H02J 4/00 |
| 2023/0011720 | A1 * | 1/2023 | Synstelien | H04L 12/10 |
| 2024/0129144 | A1 * | 4/2024 | Synstelien | H04L 12/10 |
| 2024/0421716 | A1 * | 12/2024 | Hua | H04L 12/40045 |
| 2025/0004520 | A1 * | 1/2025 | Goergen | G06F 1/266 |
| 2025/0076944 | A1 * | 3/2025 | Frosch | G06F 1/26 |
| 2025/0106067 | A1 * | 3/2025 | Frosch | H04L 12/10 |
| 2025/0118974 | A1 * | 4/2025 | Wang | H02J 7/50 |
| 2025/0123674 | A1 * | 4/2025 | Li | G06F 1/263 |
| 2025/0150293 | A1 * | 5/2025 | Hua | H04L 12/10 |

FOREIGN PATENT DOCUMENTS

| | | |
|---|---|---|
| CN | 109361522 A | 2/2019 |
| CN | 113595745 A | 11/2021 |
| CN | 113938333 A | 1/2022 |
| CN | 114629346 A | 6/2022 |
| CN | 115134178 A | 9/2022 |

OTHER PUBLICATIONS

Chinese Search Report received for CN Serial No. 2022109091481, 1 page.

* cited by examiner

POWER OVER ETHERNET SYSTEM, RELATED METHOD AND RELATED APPARATUS

CROSS-REFERENCE TO RELATED APPLICATION

The present disclosure claims priority to Chinese Patent Application No. 202210909148.1, filed to the China National Intellectual Property Administration on Jul. 29, 2022 and entitled "Power over Ethernet System, Related Method and Related ApPparatus", which is incorporated herein by reference in its entirety.

TECHNICAL FIELD

The present disclosure relates to the technical field of Power over Ethernet, and in particular, to a power over Ethernet system, a method for controlling a power over Ethernet system, a device, and a non-transitory readable storage medium.

BACKGROUND

With the continuous development of information technology, a PoE (Power over Ethernet) system emerges. The PoE system includes two parts: a PSE (Power Sourcing Equipment) and a PD (Powered Device). The PSE is a device for supplying power to an Ethernet client device, and is also a manager of the whole PoE (Power over Ethernet) process; and the PD is a PSE load that receives power supply, i.e. the client device of the PoE system, e.g. other Ethernet devices such as an IP (Internet Protocol) phone, a network security camera, an AP (Access Point) and a palmtop computer or a mobile phone charger, etc. Both of them establish, on the basis of the IEEE (Institute of Electrical and Electronics Engineers) 802.3 standard, an information association in aspects such as connection status, device type and power consumption level, etc. of the powered device (PD), and on this basis, the PSE provides power to the PD over Ethernet.

In the related art, a power supply system inside an electronic device consists of power supply modules, a network port module, a rectification module, diodes, a PD module and a PSE module. The power supply system may act as both a PSE and a PD. Countercurrents are prevented by the diodes, which relies on the connector structural form of the power supply modules; and the PSE and the PD separately use a power supply module, and need to exist at the same time, causing a high cost and occupation of a large space, being not applicable in current highly integrated and highly reliable environments.

SUMMARY

The present disclosure provides a power over Ethernet system, a method for controlling a power over Ethernet system, a device, and a non-transitory readable storage medium.

Some embodiments of the present disclosure provide a power over Ethernet system, including: at least one network port module, configured to achieve power over Ethernet or receive electric energy provided by Ethernet;
    a power supply module, configured to acquire the electric energy;
    a power consumption module, configured to act as a load component using the electric energy; and at least one integrated power supply and power receiving module, configured to supply power to the network port module by the electric energy acquired from the power supply module when in a power supply mode, and supply power to the power assumption module by the electric energy acquired from the network port module when in a power receiving mode.

In some embodiments, the integrated power supply and power receiving module includes:
    a non-polar bidirectional power converter, configured to achieve bidirectional power transmission; and
    an autonomous negotiation control component, configured to determine a working mode of the power over Ethernet system, and control, in a case that the working mode is the power supply mode, the non-polar bidirectional power converter to supply power to the network port module by the electric energy acquired from the power supply module; and configured to control, in a case that the working mode is the power receiving mode, the non-polar bidirectional power converter to supply power to the power consumption module by the electric energy acquired from the network port module.

In some embodiments, the autonomous negotiation control component includes a system control subcomponent, a power consumption control subcomponent, a power control subcomponent, a switch control subcomponent, and a handshake control subcomponent.

In some embodiments, the non-polar bidirectional power converter is a bidirectional isolated converter or a bidirectional DC-DC converter.

In some embodiments, the autonomous negotiation control component is specifically configured to determine whether power supply access exists in the power supply module; set the working mode as the power supply mode and execute a power supply operation process when the power supply access exists in the power supply module; and set the working mode as the power receiving mode and execute a power receiving operation process when the power supply access does not exist in the power supply module.

In some embodiments, the network port module is an RJ45 network port connector.

In some embodiments, the power supply module is one of the following: an adapter, an industrial power supply system, a battery pack, other power over Ethernet system.

In some embodiments, there are a plurality of integrated power supply and power receiving modules; and a first integrated power supply and power receiving module is in the power supply mode, and a second integrated power supply and power receiving module is in the power receiving mode.

In some embodiments, an output end of the second integrated power supply and power receiving module is connected to an input end of the first integrated power supply and power receiving module.

In some embodiments, a network port module corresponding to the second integrated power supply and power receiving module is connected to other power over Ethernet system, and is configured to receive electric energy.

In some embodiments, there are a plurality of network port modules; and the plurality of network port modules are configured to achieve power over Ethernet for a plurality of powered devices.

In some embodiments, the plurality of powered devices are power over Ethernet systems.

Some embodiments of the present disclosure further provide a method for controlling a power over Ethernet system, including:

a working mode of the power over Ethernet system is determined;

in a case that the working mode is a power supply mode, a non-polar bidirectional power converter of an integrated power supply and power receiving module is controlled to supply power to a network port module by electric energy acquired from a power supply module; and in a case that the working mode is a power receiving mode, the non-polar bidirectional power converter of the integrated power supply and power receiving module is controlled to supply power to a power consumption module by electric energy acquired from the network port module.

Some embodiments of the present disclosure further provide a device, including:

a memory, configured to store a computer program; and a processor, configured to implement steps of the method above when executing the computer program.

Some embodiments of the present disclosure further provide a non-transitory readable storage medium; the non-transitory readable storage medium stores a computer program, and when the computer program is executed by a processor, steps of the method above are implemented.

The power over Ethernet system provided in some embodiments of the present disclosure, includes: at least one network port module, configured to achieve power over Ethernet or receive electric energy provided by Ethernet; a power supply module, configured to acquire the electric energy; a power consumption module, configured to act as a load component using the electric energy; and at least one integrated power supply and power receiving module, configured to supply power to the network port module by the electric energy acquired from the power supply module when in a power supply mode, and supply power to the power assumption module by the electric energy acquired from the network port module when in a power receiving mode.

Some embodiments of the present disclosure further provide a method for controlling a power over Ethernet system, a device, and a non-transitory readable storage medium.

BRIEF DESCRIPTION OF THE DRAWINGS

In order to describe the technical solutions in the embodiments of the present disclosure or in the related art more clearly, hereinafter, accompanying drawings requiring to be used in the embodiments of the present disclosure or the related art will be introduced briefly. Apparently, the accompanying drawings in the following description merely relate to embodiments of the present disclosure, and for a person of ordinary skill in the art, other accompanying drawings may also be obtained according to the provided accompanying drawings without involving any inventive effort.

DETAILED DESCRIPTION OF THE EMBODIMENTS

The core of some embodiments of the present disclosure is to provide a power over Ethernet system, a method for controlling a power over Ethernet system, a device, and a non-transitory readable storage medium, so as to reduce the cost of a PoE system and improve the integration level of a device.

To make the objects, technical solutions and advantages of embodiments of the present disclosure clearer, hereinafter, the technical solutions in embodiments of the present disclosure will be described clearly and thoroughly in combination with the accompanying drawings in the embodiments of the present disclosure. Apparently, the embodiments as described are merely some rather than all of the embodiments of the present disclosure. All other embodiments obtained by a person of ordinary skill in the art on the basis of the embodiments of the present disclosure without any inventive effort shall all fall within the scope of protection of the present disclosure.

In the related art, a power supply system inside an electronic device consists of power supply modules, a network port module, a rectification module, diodes, a PD module and a PSE module. The power supply system may act as both a PSE and a PD. Countercurrents are prevented by the diodes, which relies on the connector structural form of the power supply modules; and the PSE and the PD separately use a power supply module, and need to exist at the same time, causing a high cost and occupation of a large space, being not applicable in current highly integrated and highly reliable environments.

Therefore, some embodiments of the present disclosure provide a power over Ethernet system, in which by an integrated power supply and power receiving module, when in a power supply mode, power is supplied to a network port module by electric energy acquired from a power supply module; and when in a power receiving mode, power is supplied to a power assumption module by electric energy acquired from the network port module. That is to say, functions of a power sourcing equipment and a powered device are realized in one power over Ethernet system, and electric energy diversion is achieved by a unified integrated power supply and receiving module instead of using a plurality of power devices, thereby reducing costs and improving the space utilization and integration level.

Hereinafter, the power over Ethernet system provided according to some embodiments of the present disclosure will be described with reference to some embodiments.

Figure 1:
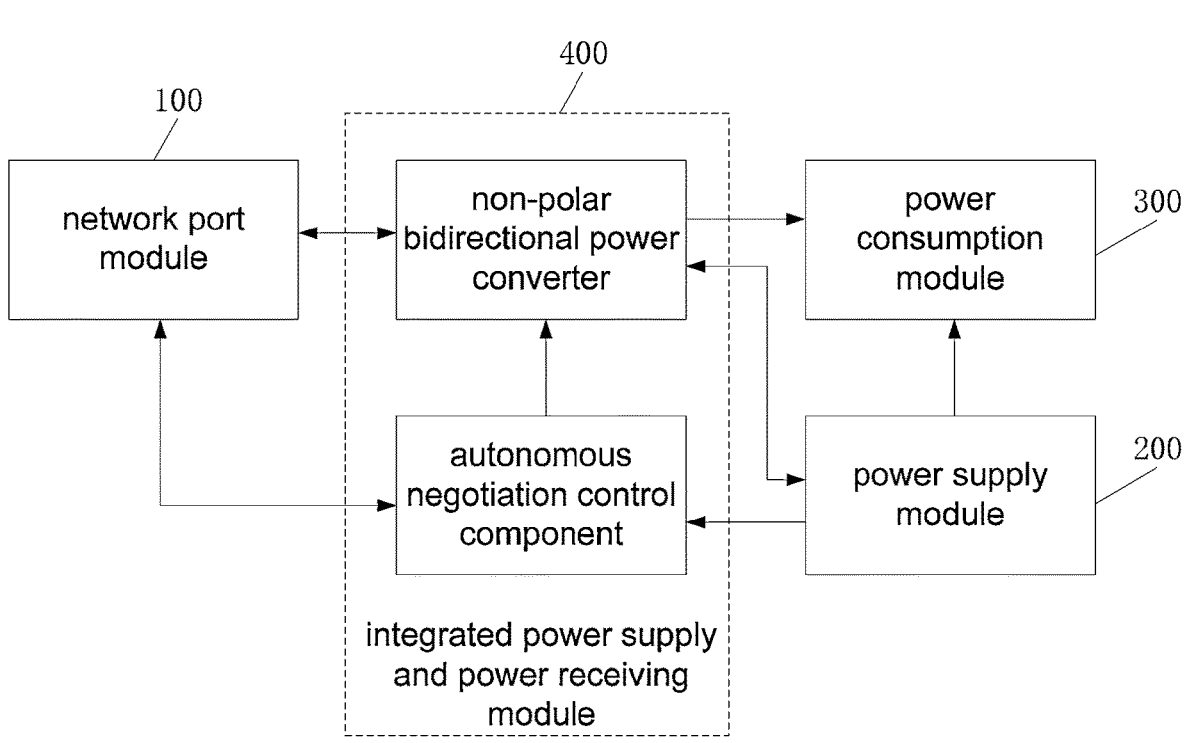
FIG. 1 is a schematic structural diagram of a power over Ethernet system provided according to embodiments of the present disclosure.

Please refer to FIG. 1, FIG. 1 is a schematic structural diagram of a power over Ethernet system provided according to embodiments of the present disclosure.

In this embodiment, the system may include:

at least one network port module 100, configured to achieve power over Ethernet or receive electric energy provided by Ethernet;

a power supply module 200, configured to acquire the electric energy;

a power consumption module 300, configured to act as a load component using the electric energy; and at least one integrated power supply and power receiving module 400, configured to supply power to the network port module 100 by the electric energy acquired from the power supply module 200 when in a power supply mode, and supply power to the power assumption module 300 by the electric energy acquired from the network port module 100 when in a power receiving mode.

Hence, in the present embodiment, by the integrated power supply and power receiving module 400, when in the power supply mode, power is supplied to the network port module 100 by the electric energy acquired from the power supply module 200; and when in the power receiving mode, power is supplied to the power assumption module 300 by the electric energy acquired from the network port module 100. That is to say, when in the power supply mode, the power over Ethernet system may be regarded as a power sourcing equipment in a power over Ethernet network; and when in the power receiving mode, the power over Ethernet system may be regarded as a powered device in the power over Ethernet network. Therefore, the power over Ethernet system may be converted into devices with different functions in different modes.

Correspondingly, the network port module 100 also has different functions in different modes. When the power over Ethernet system is in the power supply mode, that is, is a power sourcing equipment currently, a network port module outputs electric energy, so as to supply power to other powered devices. When the power over Ethernet system is in a power receiving mode, that is, is a powered device currently, the network port module receives electric energy from other power sourcing equipment to achieve power receiving.

Correspondingly, the power supply module 200 also has different functions in different modes. When the power over Ethernet system is a power sourcing equipment, the power supply module 200 acquires electric energy. When the power over Ethernet system is a powered device, the power supply module 200 does not supply power.

In addition, the power consumption module 300 is a load in the system in different modes, and is used for receiving electric energy. When the power over Ethernet system is a power sourcing equipment, the power consumption module 300 acquires electric energy from the power supply module 200. When the power over Ethernet system is a powered device, the power consumption module 300 acquires electric energy from the integrated power supply and power receiving module 400.

In some embodiments, in order to increase the efficiency of electric energy conversion, further reduce the costs of the modules, and improve the integration level of the modules, the integrated power supply and power receiving module 400 may include:

a non-polar bidirectional power converter, configured to achieve bidirectional power transmission; and an autonomous negotiation control component, configured to determine a working mode of the power over Ethernet system, and control, in a case that the working mode is the power supply mode, the non-polar bidirectional power converter to supply power to the network port module 100 by the electric energy acquired from the power supply module 200; and configured to control, in a case that the working mode is the power receiving mode, the non-polar bidirectional power converter to supply power to the power consumption module 300 by the electric energy acquired from the network port module 100.

The non-polar bidirectional power converter is configured to achieve bidirectional electric energy transmission. That is to say, bidirectional electric energy transfer is realized only by a single device rather than a plurality of devices, which reduces half the cost and half the space occupation.

In some embodiments, the non-polar bidirectional power converter is a bidirectional isolated converter or a bidirectional DC-DC converter, may also be a bidirectional non-polar forward-flyback converter, and may also be a bidirectional isolated converter.

In some embodiments, the autonomous negotiation control component includes a system control subcomponent, a power consumption control subcomponent, a power control subcomponent, a switch control subcomponent, and a handshake control subcomponent. These control subcomponents are control functions included in the autonomous negotiation control component. All or some of the control functions may be completed by integrated and centralized design of devices such as a DSP (Digital Signal Processor), an MCU (micro controller component, a microprocessor), and an ASIC (Application specific integrated circuit); and some of the functions may be completed by design of devices such as a CPLD (Complex Programmable Logic Device) or by design of discrete devices.

The power consumption control subcomponent may be integrated in a dedicated chip of the power consumption module 300. The power consumption control subcomponent may implement functions of bidirectional current conduction and blocking and forward hot-swapping protection. Further, not limited to the integrated solution or the discrete device solution, selection may be made according to specific situations.

The power control subcomponent may be implemented based on software, may also be implemented by a dedicated power control chip, and may also be implemented by a digital processing chip.

The handshake control subcomponent may be implemented based on software, may also be controlled by a dedicated protocol chip, and may also implement a communication protocol by a digital processing chip.

On the basis of the described control subcomponents, furthermore, the autonomous negotiation control component is specifically configured to determine whether power supply access exists in the power supply module 200; set the working mode as the power supply mode and execute a power supply operation process when the power supply access exists in the power supply module 200; and set the working mode as the power receiving mode and execute a power receiving operation process when the power supply access does not exist in the power supply module 200. Further, it may also be that the system controls the subcomponents to perform the operations to implement corresponding operations.

The power supply operation process includes but is not limited to: determination of power consumption module

300, starting the power control subcomponent, determining the working state of the non-polar bidirectional power converter, identity recognition, PD determination, PoE handshake, handshake determination, turning on a switch of the network port module 100 to achieve power supply, and normality determination of power supply.

The power receiving operation process includes but is not limited to: handshake determination, turning on the network port module 100, determination of power supply voltage, starting power control, determining the working state of the non-polar bidirectional power converter, turning on the power consumption module 300, determination of the power consumption module 300, receiving power supply and normality determination of power supply.

In some embodiments, the network port module 100 may be an RJ45 (Registered Jack) network port connector, or a common network port supporting CAT-5 (Category 5 Cable), a network port with a hot-swapping function, and a network port supporting different lightning stroke levels. The network port module 100 may achieve functions such as turn-on/turn-off control, rectification and multi-port extension by designing an auxiliary switch circuit through some modules. The auxiliary switch circuit used includes but is not limited to, an MOSFET (Metal-Oxide-Semiconductor Field Effect Transistor), a rectifier bridge, a composite circuit formed by a diode or an MOSFET, a composite circuit formed by an MOSFET and an inductor, etc. In this embodiment, when the bidirectional power converter supports AC (Alternating Current) or non-polar input, the auxiliary switch circuit may be omitted or simplified.

In some embodiments, the power supply module 200 may be an adapter, an industrial power supply system, a battery pack, or other power over Ethernet system. That is to say, modules that may achieve a power supply function may all be used as the power supply module 200 in this embodiment.

In some embodiments, the system may further include: a plurality of integrated power supply and power receiving modules; and a first integrated power supply and power receiving module is in the power supply mode, and a second integrated power supply and power receiving module is in the power receiving mode. That is to say, the power over Ethernet system has a plurality of integrated power supply and power receiving modules, which may be in different working modes. Further, these integrated power supply and power receiving modules may be in the power supply mode at the same time, may also be in the power receiving mode at the same time, and it may also be that some modules are in the power supply mode and some modules are in the power receiving mode. Hence, no matter what mode the integrated power supply and power receiving modules in the power over Ethernet system are in, the performance of the power supply system may be improved, and the power supply capability may be improved. Moreover, when some modules are in the power supply mode and some modules are in the power receiving mode, the power over Ethernet system has the identity of both a power sourcing equipment and a powered device, and may supply power to other powered devices while providing electric energy to a local powered device, thereby implementing cascading of a plurality of systems and improving the effect of electric energy transmission.

In some embodiments, an output end of the second integrated power supply and power receiving module is connected to an input end of the first integrated power supply and power receiving module. Input of the first integrated power supply and power receiving module may come from output of the second integrated power supply and power receiving module, so that electric energy is received for use and outputted in the power over Ethernet system, thereby achieving cascading of the power over Ethernet system.

In some embodiments, a network port module corresponding to the second integrated power supply and power receiving module is connected to other power over Ethernet system, and is configured to receive electric energy. That is, input of the second integrated power supply and power receiving module may come from other power over Ethernet systems.

In some embodiments, the system may further include: a plurality of network port modules; and the plurality of network port modules are configured to achieve power over Ethernet for a plurality of powered devices. Hence, in this optional solution, the power over Ethernet system may supply power to a plurality of devices via the plurality of network port modules, thereby increasing the efficiency of power supply.

In some embodiments, the powered devices are power over Ethernet systems. Powered devices connected to the plurality of network port modules may be power over Ethernet systems.

In summary, in this embodiment, by the integrated power supply and power receiving module, when in the power supply mode, power is supplied to the network port module by the electric energy acquired from the power supply module; and when in the power receiving mode, power is supplied to the power assumption module by the electric energy acquired from the network port module. That is to say, functions of a power sourcing equipment and a powered device are realized in one power over Ethernet system, and electric energy diversion is achieved by a unified integrated power supply and receiving module instead of using a plurality of power devices, thereby reducing costs and improving the space utilization and integration level.

Hereinafter, a power over Ethernet system provided according to some embodiments of the present disclosure will be further described with reference to some other specific embodiments.

Figure 2:
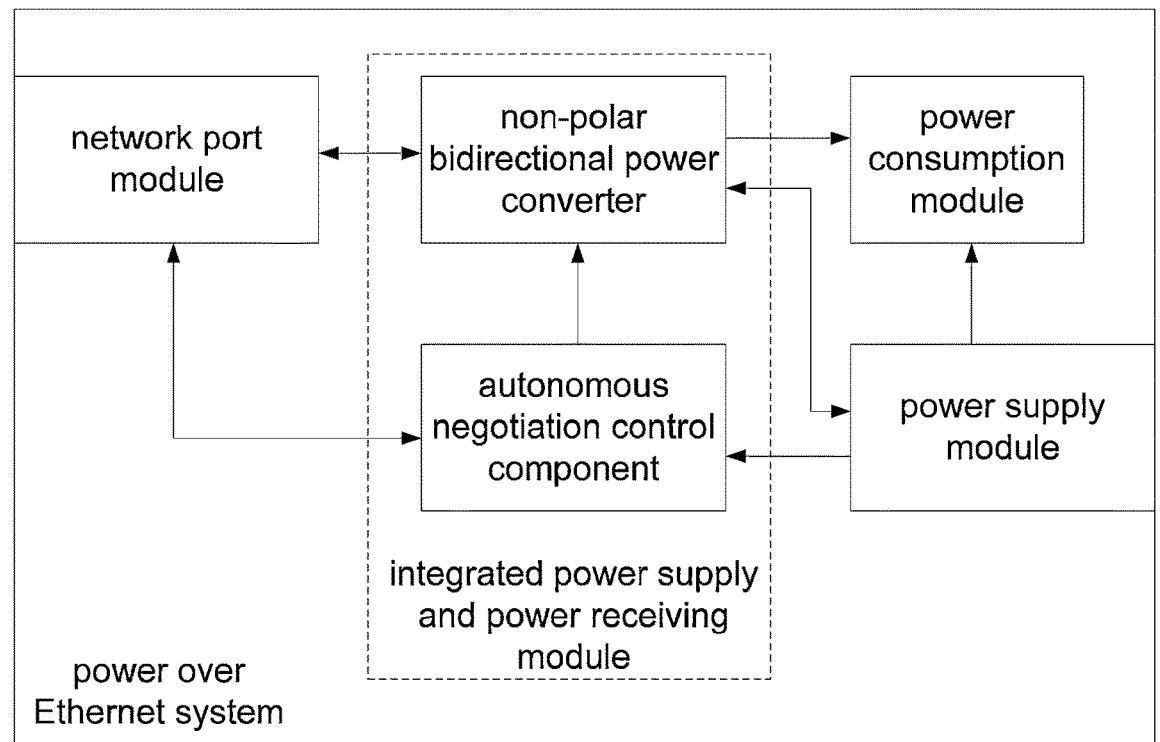
FIG. 2 is a schematic structural diagram of another power over Ethernet system provided according to embodiments of the present disclosure.

Please refer to FIG. 2, FIG. 2 is a schematic structural diagram of another power over Ethernet system provided according to embodiments of the present disclosure.

This embodiment provides a full bidirectional autonomous negotiation PoE (Power over Ethernet) system, which is formed by a power supply module, a network port module, an integrated power supply and power receiving module that is formed by a non-polar bidirectional power converter and an autonomous negotiation control component, and a power consumption module. Said system may achieve bidirectional power supply of PoE, and autonomous identity negotiation of a PoE device, that is, it is automatically determined whether a currently operating identity is a power sourcing equipment or a powered device.

The non-polar bidirectional power converter included in the integrated power supply and power receiving module is configured to achieve bidirectional energy transmission. Compared with the related art, the advantages thereof lie in that bidirectional energy transfer is realized by only one module, so that the cost is reduced by about 50%, and the space is reduced by about 50%.

In addition, the autonomous negotiation control component included in the integrated power supply and power receiving module may autonomously negotiate to confirm the identity of the power sourcing equipment and the powered device of a PoE communication device and the energy transmission direction. Compared with the related art, the advantages thereof lie in that an autonomous negotiation policy may allow for automatic and intelligent determination and confirmation of converting a communication device as a power supply and receiving role of a PoE device, thereby realizing automatic determination and increasing the operation efficiency.

Figure 3:
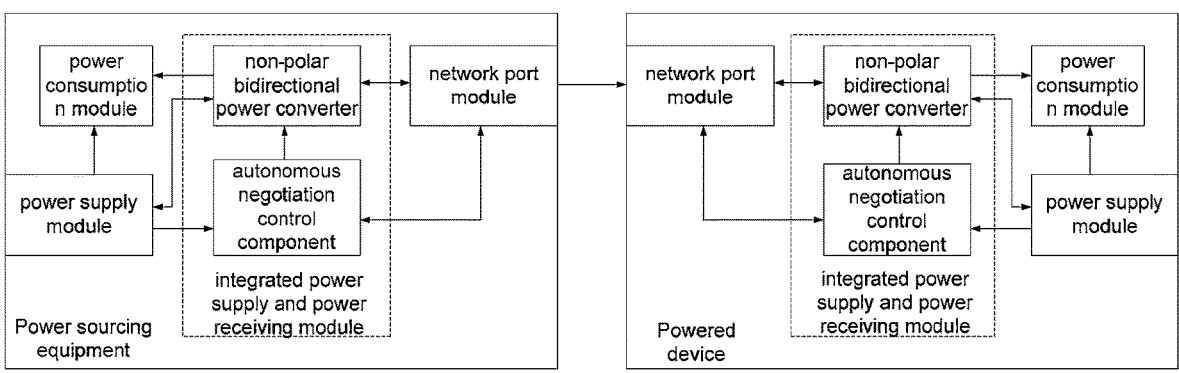
FIG. 3 is a schematic diagram of power supply of another power over Ethernet system provided according to embodiments of the present disclosure.

Please refer to FIG. 3, FIG. 3 is a schematic diagram of power supply of another power over Ethernet system provided according to embodiments of the present disclosure.

As shown in FIG. 3, when a PoE device is used as a power sourcing equipment, electric energy enters the device from a power supply module, and in addition to providing required energy for a power consumption module inside the device, energy is also provided for an integrated power supply and power receiving module. Power is supplied to an autonomous negotiation control component, and an autonomous negotiation control policy is started; and power is supplied to a non-polar bidirectional power converter, electric energy is transmitted to a network port module, and then power is supplied to an external powered device via the network port module.

As shown in FIG. 3, when the PoE device is used as a powered device, after a power sourcing equipment autonomously negotiates with the powered device successfully, energy is transferred from a network port module of the power sourcing equipment to a network port module of the powered device, and then transferred to a power consumption module by a non-polar bidirectional power converter.

Figure 7:
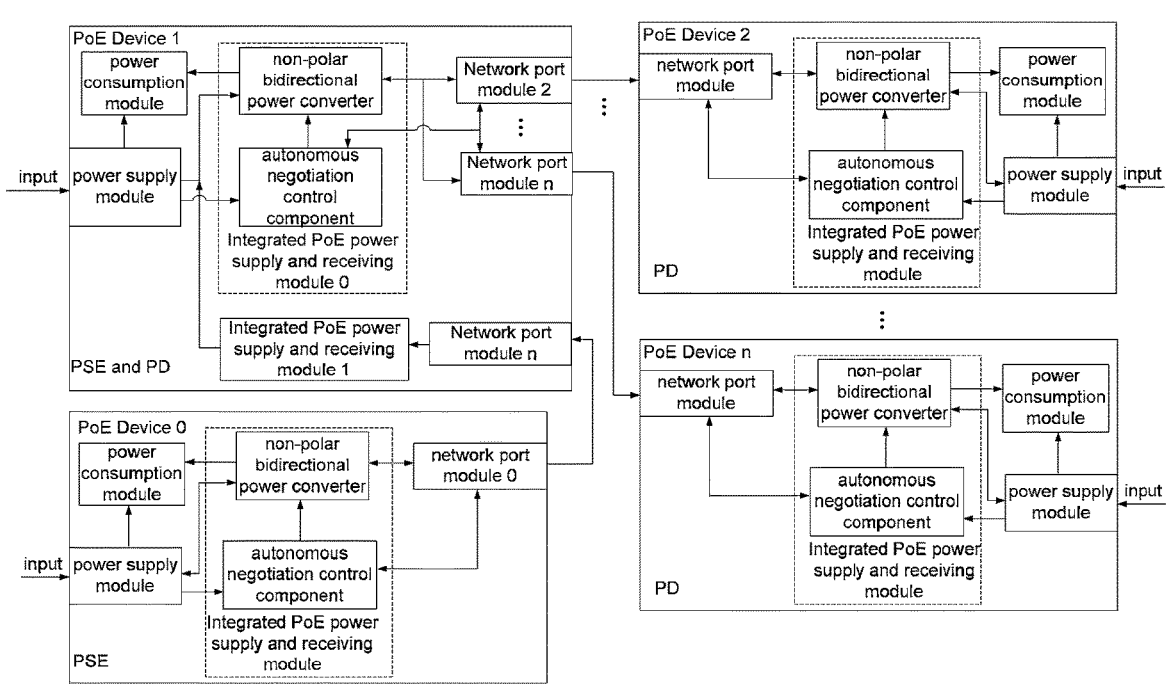
FIG. 7 is a schematic diagram of cascading of a power over Ethernet system provided according to embodiments of the present disclosure.

Please refer to FIG. 7, FIG. 7 is a schematic diagram of cascading of a power over Ethernet system provided according to embodiments of the present disclosure.

FIG. 7 is mainly a schematic diagram of an extension manner of a PoE device, i.e. PSE (Power Sourcing Equipment) supplying power to a PD (Powered Device). In this embodiment, PoE device cascading extension applied by the full bidirectional autonomous negotiation PoE system may form a highly-reliable power supply system and a PoE device system. It may be realized by multiple integrated PoE power supply and receiving modules and multiple network port modules, and may also be realized by simplification of a single integrated PoE power supply and receiving module and multiple network port modules.

The PoE system in this embodiment may be cascaded and connected in parallel, and is extended to a multi-level composite form PoE system. In the PoE system, integrated PoE power supply and receiving modules inside the PoE device may be extended in parallel, so that the PoE device may have dual identities of both PSE and PD.

In addition, in the PoE system in this embodiment, multiple ports may be extended in parallel through multiple network port modules inside the PoE device, so that the PSE may supply power to a plurality of PDs. Multiple PoE devices applying the present disclosure have a power supply component for external input and power supply, so that a cascading/parallel extended composite form PoE system becomes a highly-reliable mutual power backup and mutual redundancy power supply architecture.

As shown in FIG. 7, in some embodiments of the present disclosure, the extension manner of the PoE device, i.e. PSE supplying power to the PD is intended to briefly describe a basic form in which the fully bidirectional PoE system in some embodiments of the present disclosure may be flexibly extended, cascaded and connected in parallel. By extension, a variety of multi-level PoE system architectures may be formed to satisfy networking requirements of different application scenarios; and an intelligent and highly-reliable power supply system flexibly converting the identity of mutual standby PoE devices may be formed in the presence of multiple input standby power supplies, thereby improving the application range of the power over Ethernet system of the present embodiment.

Further, as shown in FIG. 7, in this embodiment, regarding the extension manner in which a PoE device, i.e. PSE supplies power to a PD, a PoE device 0 serves as the PSE, and energy thereof comes from external input (including but not limited to an adapter, industrial power supply and conversion, battery pack and conversion, or even a combination form of a plurality of different energy sources, etc.), and is transferred to a network port module 0 of the PoE device 0 via an integrated PoE power supply and receiving module of the PoE device 0. After the PoE device 0 successfully handshakes with a PoE device 1, energy is transferred to a network port module 1 of the PoE device 1 via the network port module 0 of the PoE device 0, the energy is transferred to an integrated PoE power supply and receiving module 1 of the PoE device 1 via the network port module 1 of the PoE device 1, and a power supply component is connected to supply power to power consumption components such as the PoE device 1, etc., and at this time, the PoE device 1 is a PD with respect to the PoE device 0. Energy is transferred to an integrated PoE power supply and receiving module 0 of the PoE device 1 via the integrated PoE power supply and receiving module 1 of the PoE device 1, and after successfully handshaking with one or more or all of PoE devices from PoE device 2 to PoE device n, the PoE device 1 supplies power to successfully handshaken PoE devices; and in this case, the PoE device 1 is a PSE with respect to the PoE device 2 to the PoE device n. That is to say, the PoE device 1 may have dual identities of both a PSE and a PD. The PoE device 2 to the PoE device n are PD identities, and receive power supplied from the PoE device 1 via respective network port modules. In cases where similar to the PoE device 1, the PoE device 0 to the PoE device n respectively have multiple integrated PoE power supply and receiving modules and multiple network port modules, the system may be extended into a meshed PoE system; and in cases where respective external inputs thereof exist, the system may be extended into a mutually-redundant self-powered highly-reliable PoE system.

Hence, by the cascade and parallel extension, the power over Ethernet system may be PSE or PD of each other, forms a crossed and intelligent mutual power backup and mutual redundancy power supply system, and the intelligent meshed PoE system has extremely high power supply reliability.

Figure 4:
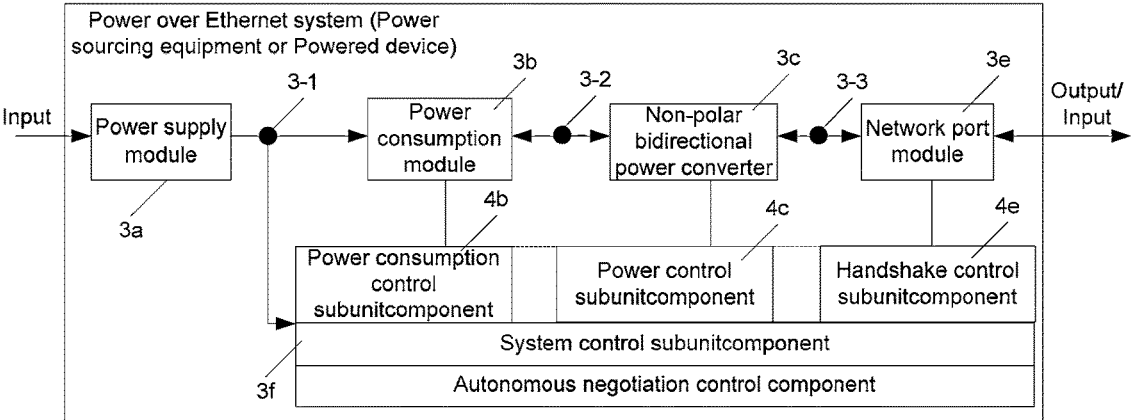
FIG. 4 is a schematic diagram of specific implementation of another power over Ethernet system provided according to embodiments of the present disclosure.

Please refer to FIG. 4, FIG. 4 is a schematic diagram of specific implementation of another power over Ethernet system provided according to embodiments of the present disclosure.

As shown in FIG. 4, FIG. 4 is a block diagram of a specific implementation solution of a full bidirectional autonomous negotiation PoE device power supply system according to this embodiment. The specific implementation solution of the full bidirectional autonomous negotiation PoE device power supply system is formed by a power supply module, a power consumption module, a non-polar bidirectional power converter, a switch circuit, an RJ45 network port, and an autonomous negotiation control component. The autonomous negotiation control component is composed of system control subcomponent, power consumption control subcomponent, power control subcomponent, switch control subcomponent, and handshake control subcomponent. Bidirectional power supply of PoE, and autonomous identity negotiation of a PoE device may be achieved.

The power supply module 3a includes but is not limited to an adapter, industrial power supply and conversion system, battery pack and conversion system, or even power supply system from the PoE, or even a combination system form of a plurality of different energy sources, etc. The power supply module generates a relatively stable direct current voltage at a point 3-1, the voltage is a determined value or a voltage value within a certain range. The voltage at the point 3-1 is detected by power consumption control subcomponent 4 for power consumption starting control (such as hot-swapping, eFuse (a one-time programmable memory), etc.); and the voltage at the point 3-1 is also detected by system control subcomponent 3f for use in a control system, and may also be used to determine the identity of the PoE device.

The identity feature of the PoE device applied in this embodiment may be a powered device by default, may also be a power sourcing equipment by default, and may also be an uncertain device identity by default. The default state may be set according to different practical applications, which is not specifically limited herein. For ease of illustration, this embodiment is described by a default identity as a powered device. If defaulted as a powered device, when an input voltage exists at the point 3-1 and a voltage at the point 3-2 is lower than a certain set voltage value, it is determined that the PoE device has an input source, and the identity of the powered device is converted into the identity of a power sourcing equipment; that is, in cases where the power supply module is connected to an input source for supplying power, the PoE device only serves as a power sourcing equipment, and power may be supplied to the outside through the network port module.

The power consumption module 3b is a load component that actually uses electric energy inside a PoE communication device. In conventional situation, switch devices such as hot-swapping, eFuse (a one-time programmable memory), and an MOSFET, etc. are used in the power consumption module 3b for protection control and current combining and paralleling. For ease of illustration, this embodiment is described by an eFuse formed by integrated back-to-back MOSFETs. It is characterized by composing of two MOSFETs of which sources S are connected to each other, and bidirectional currents may be blocked when the two MOSFETs are not turned on.

The bidirectional power converter 3c includes but is not limited to, a bidirectional non-polar forward-flyback converter, a bidirectional isolated converter, and a bidirectional DC-DC converter (Direct current-Direct current converter). The main feature different from the related art is that: the power converter 3c is a bidirectional converter.

When an endpoint 3-2 is an input end, an endpoint 3-3 serves as an output end; and when the endpoint 3-3 is an input end, the endpoint 3-2 serves as an output end.

The current and energy at two ends of the converter are transferred bidirectionally. When the PoE device applied in this embodiment is determined as a power sourcing equipment, energy is transferred from the endpoint 3-2 to the endpoint 3-3 through the power converter; and When the PoE device applied in this embodiment is determined as a powered device, energy is transferred from the endpoint 3-3 to the endpoint 3-2 through the power converter.

The endpoint 3-3 of the converter, when used as an input end, is characterized in that not only a DC input but also an AC input may be supported, or AC (Alternating current) and DC (Direct current) inputs may be simultaneously supported, i.e. supporting non-polar input. Hence, in this embodiment, the input manner of the converter is not unique, and a proper input manner may be selected according to specific situations, which is not specifically limited herein.

A core component of the network port module 3e may be an RJ45 network port connector, and also includes but is not limited to a common network port supporting CAT-5, a network port with a hot-swapping function, and a network port supporting different lightning stroke levels. A part of the design of the network port module may also assist the switch circuit to implement functions such as turn-on/turn-off control, rectification and multi-port extension. The auxiliary switch circuit used includes but is not limited to, an MOSFET, a rectifier bridge, a composite circuit formed by a diode or an MOSFET, a composite circuit formed by an MOSFET and an inductor, etc. In this embodiment, the 3-3 port of the bidirectional power converter 3c supports AC or non-polar input, and the auxiliary switch circuit may be omitted or simplified, so as to reduce costs.

In addition, the autonomous negotiation control component consists of system control subcomponent 3f, power consumption control subcomponent 4b, power control subcomponent 4c, and handshake control subcomponent 4e. The autonomous negotiation control component executes the autonomous negotiation policy of the bidirectional PoE power supply system provided in this embodiment.

The autonomous negotiation control component includes system control subcomponent 3f, power consumption control subcomponent 4b, power control subcomponent 4c, and handshake control subcomponent 4e. All or some of the control functions may be completed by integrated and centralized design of devices such as a DSP, an MCU, and an ASIC; and some of the functions may be completed by design of devices such as a CPLD or by design of discrete devices.

The power consumption control subcomponent 4b may be integrated in a dedicated chip of the power consumption module 3b, which may implement functions of bidirectional current conduction and blocking and forward hot-swapping protection. This embodiment is not limited to the integrated solution or the discrete device solution.

The power control subcomponent 4c includes but is not limited to being implemented using a dedicated power control chip or a digital processing chip.

The handshake control subcomponent 4e includes but is not limited to controlling by a dedicated protocol chip or implementing a communication protocol by a digital processing chip.

Figure 5:
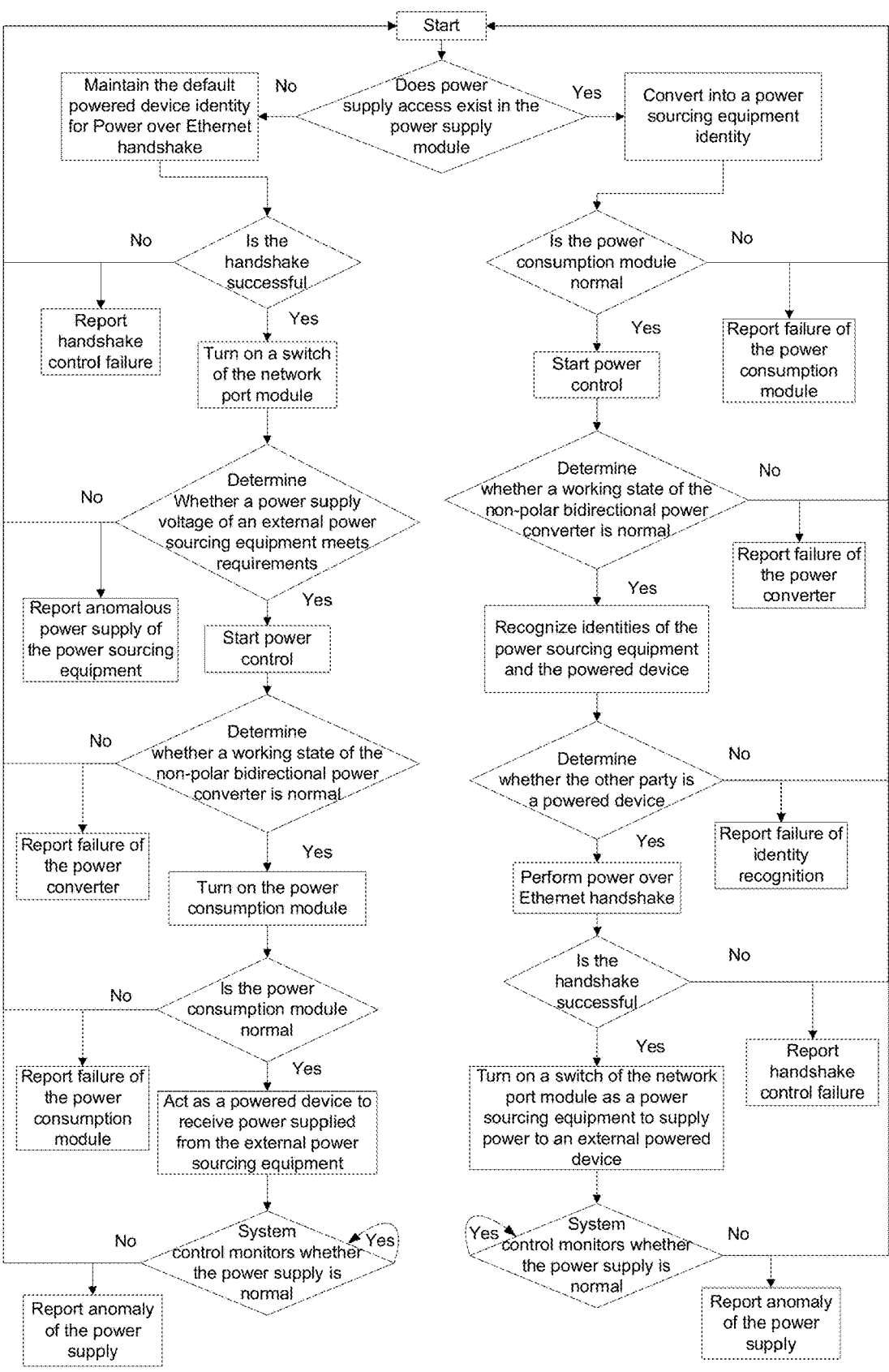
FIG. 5 is a flowchart of autonomous negotiation of another power over Ethernet system provided according to embodiments of the present disclosure.

Please refer to FIG. 5, FIG. 5 is a flowchart of autonomous negotiation of another power over Ethernet system provided according to embodiments of the present disclosure.

FIG. 5 is a simplified flowchart of an autonomous negotiation policy according to some embodiments of the present disclosure. As shown in FIG. 5, the system control subcomponent 3f mainly controls the whole system in some embodiments of the present disclosure, including but not limited to autonomous identity negotiation control, power on/off timing control, and power supply on/off control.

This embodiment is described by taking the default identity as a powered device. When the input end does not supply power, the power supply module does not work, and the endpoint 3-1 does not have an input voltage; and in this case, the power over Ethernet device in this embodiment is considered as a powered device by default, and is connected to other power sourcing equipment by the RJ45 network port in the network port module 3e, and may be identified as a powered device. The power supply level is determined by the handshake control subcomponent 4e to implement power supply by the power over Ethernet system.

When the input end has a power supply input, the endpoint 3-1 has an input voltage; and in this case, the power over Ethernet device in this embodiment converts the entity of the default powered device into the entity of a power sourcing equipment through the system control, and is connected to another powered device by the RJ45 network port in the network port module 3e, and the power supply of the power over Ethernet system is implemented by autonomously detecting the power supply level of the powered device through the handshake control subcomponent 4e.

Then, a control circuit included in the power control subcomponent 4b completes a hot-swapping/eFuse control policy of the power over Ethernet system in some embodiments of the present disclosure, so as to implement power on/off timing control of the hot-swapping/eFuse; and in cooperation with the system control subcomponent 3f, autonomous identity recognition of the power over Ethernet device is completed, thereby ensuring that the power sourcing equipment and the powered device in the power over Ethernet system perform smooth and autonomous negotiation and docking with each other. In extremely special situations, input power supply exists in inputs of two power over Ethernet devices applying the present disclosure, that is to say, a voltage exists at the port 3-1, and both the devices are set as the identity of a power sourcing equipment; and by system control, eFuse control and handshake control, autonomous negotiation is achieved according to device parameters such as different power level identity codes, and identity conversion from the power sourcing equipment to a powered device is completed, thereby achieving a power over Ethernet system in a normal operation.

Finally, the power supply control subcomponent 4c realizes the control of the non-polar bidirectional power converter, including but not limited to including a forward control policy, a flyback control policy, an interleaving control policy, a double-transistor forward control policy, a double-transistor flyback control policy, a full-bridge control policy, a push-pull control policy, a feed-forward system, a voltage feedback system and a current feedback system.

In addition, the handshake control subcomponent 4e completes handshake policy control between the power sourcing equipment and the powered device in the power over Ethernet system in this embodiment, and implements detection and power supply meeting protocols such as IEEE 802.3 af (Application framework), at (Authenticated Transfer), and bt (Bit Torren).

Hence, in the full bidirectional autonomous negotiation power over Ethernet system of this embodiment, the non-polar bidirectional power converter achieves full bidirectional power supply for a power over Ethernet device; and the autonomous negotiation control policy achieves identity setting, recognition and autonomous negotiation, etc. of the power over Ethernet device. The power over Ethernet system applied in this embodiment is intelligent, has a smaller volume (about 50% reduction) and a lower cost (about 50% reduction), without using a plurality of power devices, thereby reducing costs and improving the space utilization and integration level.

Hereinafter, a method for controlling a power over Ethernet system provided in embodiments of the present disclosure will be introduced. The method for controlling the power over Ethernet system described below and the power over Ethernet system described above may be referred to each other correspondingly.

Figure 6:
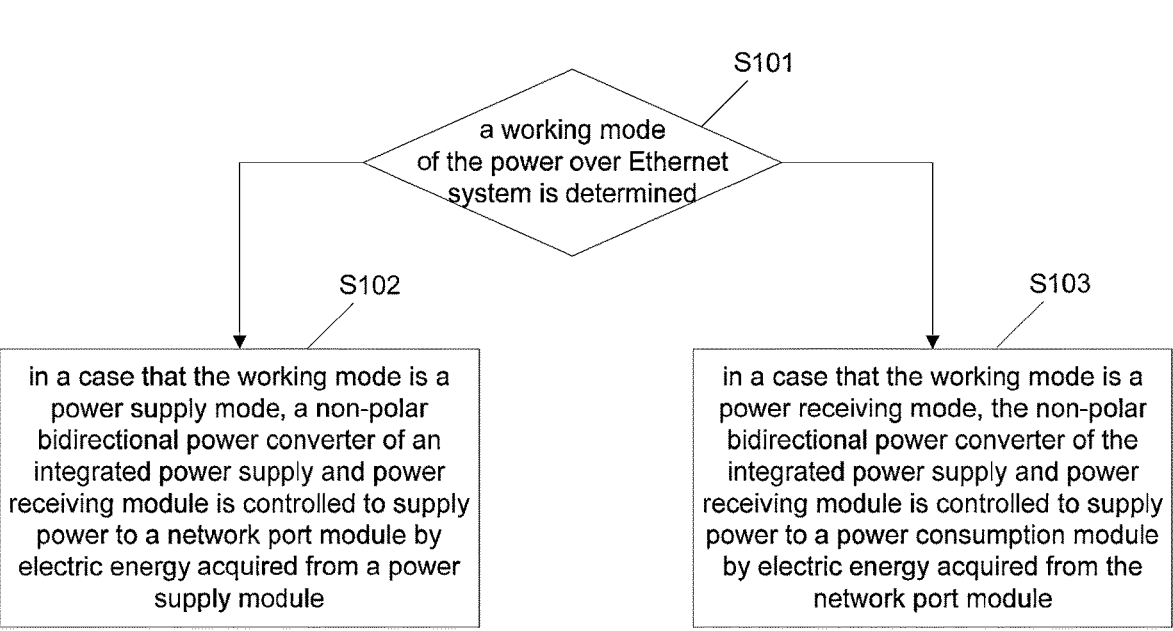
FIG. 6 is a flowchart of a method for controlling a power over Ethernet system provided according to embodiments of the present disclosure.

Please refer to FIG. 6, FIG. 6 is a flowchart of a method for controlling a power over Ethernet system provided according to embodiments of the present disclosure.

In this embodiment, the method may include:

S101, a working mode of the power over Ethernet system is determined;

S102, in a case that the working mode is a power supply mode, a non-polar bidirectional power converter of an integrated power supply and power receiving module is controlled to supply power to a network port module by electric energy acquired from a power supply module; and S103, in a case that the working mode is a power receiving mode, the non-polar bidirectional power converter of the integrated power supply and power receiving module is controlled to supply power to a power consumption module by electric energy acquired from the network port module.

Figure 8:
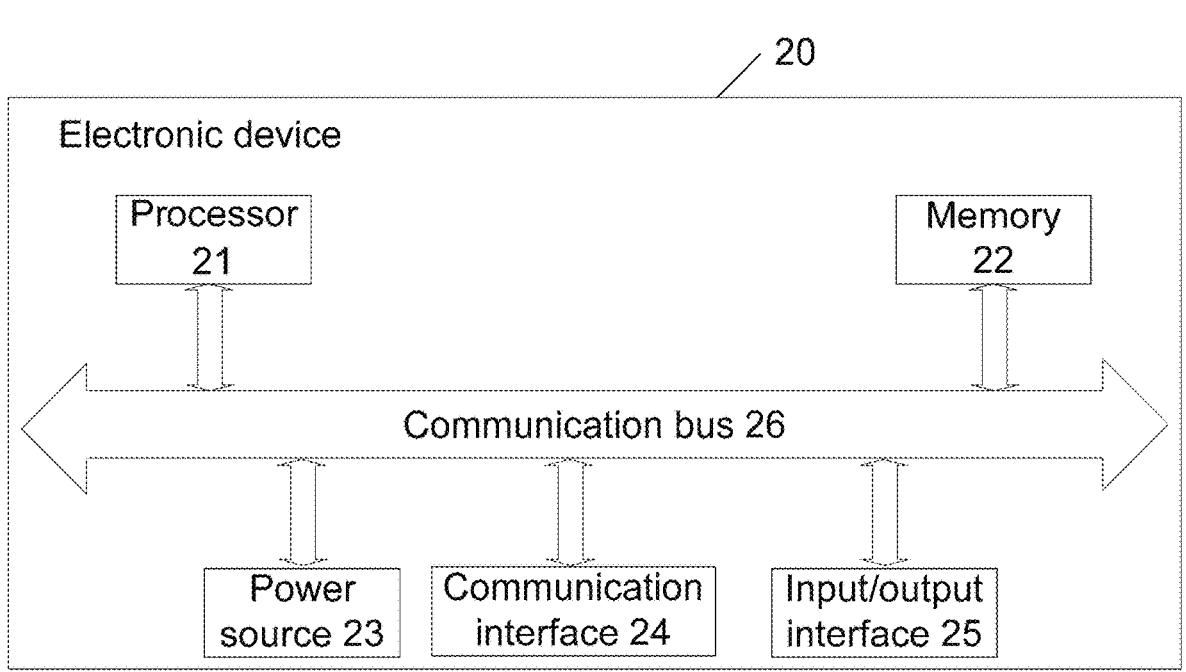
FIG. 8 is a structural diagram of an electronic device disclosed in some embodiments of the present disclosure.

Refer to FIG. 8, embodiments of the present disclosure disclose an electronic device 20, including a processor 21 and a memory 22; and the memory 22 is configured to store a computer program; and the processor 21 is configured to execute a computer program, to implement the method for controlling the power over Ethernet system disclosed in the embodiments above.

For specific processes of the power over Ethernet system, the method for controlling the power over Ethernet system, the device, and the non-transitory readable storage medium, reference may be made to the corresponding content disclosed in the embodiments above, and details will not be repeated herein.

In addition, the memory 22, as a carrier for resource storage, may be a read-only memory, a random access memory, a magnetic disk or an optical disk, etc.; and the storage manner may be temporary storage or permanent storage.

In addition, the electronic device 20 may include: a power source 23, a communication interface 24, an input/output interface 25 and a communication bus 26; and the power source 23 is used to provide a working voltage for each hardware device on the electronic device 20; the communication interface 24 may establish a data transmission channel with an external device for the electronic device 20, and a communication protocol followed thereby is any communication protocol that may be applied to the technical solutions in some embodiments of the present disclosure, which will not be specifically limited herein; and the input/output interface 25 is configured to acquire external input data or output data to the outside, and the specific interface type thereof may be selected according to specific application requirements, which will not be specifically limited herein.

Figure 9:
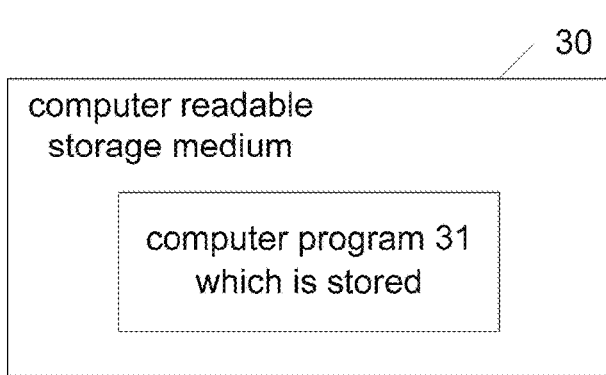
FIG. 9 is a schematic structural diagram of a non-transitory readable storage medium disclosed in some embodiments of the present disclosure.

Further, refer to FIG. 9, embodiments of the present disclosure further disclose a non-transitory readable storage medium 30 for storing a computer program 31, and when the computer program 31 is executed by a processor, the method for controlling the power over Ethernet system disclosed in the embodiments above are implemented.

Various embodiments in the description are described in a progressive manner. Each embodiment focuses on differences from other embodiments. For the same or similar parts among the embodiments, reference may be made to each other. For the apparatus disclosed in the embodiments, as the apparatus corresponds to the method disclosed in the embodiments, the illustration thereof is relatively simple, and for the related parts, reference may be made to the illustration of the method part.

A person skilled in the art may further appreciate that components and algorithm steps in examples described in combination with the embodiments disclosed herein may be implemented in the form of electronic hardware, computer software, or a combination of the two. To clearly describe the interchangeability between the hardware and the software, the illustration above has generally described compositions and steps of each example according to functions. Whether these functions are executed by hardware or software depends on specific applications and design constraint conditions of the technical solutions. A person skilled in the art could use different methods to implement the described functions for each particular application, but the implementation shall not be considered to go beyond the scope of some embodiments of the present disclosure.

The steps of the method or algorithm described in conjunction with the embodiments disclosed herein may also be directly implemented by hardware, by a software module executed by a processor, or by a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

Hereinabove, the power over Ethernet system, the control method, the device, and the non-transitory readable storage medium provided in some embodiments of the present disclosure are introduced in detail. The principle and embodiments of the present disclosure are described herein by applying specific examples, and the illustration of the embodiments above is only used to help understand the method and core ideas of some embodiments of the present disclosure; It should be noted that, a person of ordinary skill in the art may further make several improvements and modifications to some embodiments of the present disclosure without departing from the principle of the present disclosure, and these improvements and modifications also belong to the scope of protection of the claims of the present disclosure.

What is claimed is:

1. A power over Ethernet device, comprising:

at least one network port module, configured to transmit electric power via an Ethernet cable when the power over Ethernet device is in a power supply mode, and receive electric power via the Ethernet cable when the power over Ethernet device is in a power receiving mode;

a power supply module, configured to acquire the electric power when the power over Ethernet device is in the power receiving mode;

a power consumption module, configured to act as a load component using the electric power; and at least one integrated power supply and power receiving module, configured to supply power to the at least one network port module by the electric power acquired from the power supply module when in the power supply mode, and supply power to the power consumption module by the electric power acquired from the at least one network port module when in the power receiving mode;

wherein the power consumption module is configured to acquire the electric power from the power supply module when the power over Ethernet device is in the power supply mode, and acquire the electric power from the at least one integrated power supply and power receiving module when the power over Ethernet device is in the power receiving mode;

wherein the at least one network port module comprises an auxiliary switch component, and the auxiliary switch component is configured to achieve turn-on/turn-off control, rectification and multi-port extension.

2. The power over Ethernet device as claimed in claim 1, wherein the integrated power supply and power receiving module comprises:

a non-polar bidirectional power converter, configured to achieve bidirectional power transmission; and an autonomous negotiation control component, configured to determine a working mode of the power over Ethernet device, and control, in a case that the working mode is the power supply mode, the non-polar bidirectional power converter to supply power to the at least one network port module by the electric power acquired from the power supply module; and configured to control, in a case that the working mode is the power receiving mode, the non-polar bidirectional power converter to supply power to the power consumption module by the electric power acquired from the at least one network port module.

3. The power over Ethernet device as claimed in claim 2, wherein the autonomous negotiation control component comprises a system control subcomponent, a power consumption control subcomponent, a power control subcomponent, a switch control subcomponent, and a handshake control subcomponent.

4. The power over Ethernet device as claimed in claim 3, wherein the system control subcomponent is configured to autonomous identity negotiation control, power on/off timing control, and power supply on/off control.

5. The power over Ethernet device as claimed in claim 3, wherein the power consumption control subcomponent is integrated in the power consumption module, and is configured to perform bidirectional current conduction and blocking and forward hot-swapping protection.

6. The power over Ethernet device as claimed in claim 3, wherein the power consumption module is further configured to cooperate with the system control subcomponent to achieve autonomous device identify recognition of the power over Ethernet device.

7. The power over Ethernet device as claimed in claim 2, wherein the non-polar bidirectional power converter is a bidirectional isolated converter or a bidirectional Direct Current-Direct Current (DC-DC for short) converter.

8. The power over Ethernet device as claimed in claim 2, wherein the autonomous negotiation control component is specifically configured to determine whether power supply access exists in the power supply module; set the working mode as the power supply mode and execute a power supply operation process when the power supply access exists in the power supply module; and set the working mode as the power receiving mode and execute a power receiving operation process when the power supply access does not exist in the power supply module.

9. The power over Ethernet device as claimed in claim 1, wherein the at least one network port module is a Registered Jack (RJ for short) 45 network port connector.

10. The power over Ethernet device as claimed in claim 1, wherein the power supply module is one of the following: an adapter, an industrial power supply system, a battery pack, other power over Ethernet device.

11. The power over Ethernet device as claimed in claim 1, there are a plurality of integrated power supply and power receiving modules; wherein a first integrated power supply and power receiving module is in the power supply mode, and a second integrated power supply and power receiving module is in the power receiving mode.

12. The power over Ethernet device as claimed in claim 11, wherein an output end of the second integrated power supply and power receiving module is connected to an input end of the first integrated power supply and power receiving module.

13. The power over Ethernet device as claimed in claim 11, wherein the at least one network port module corresponding to the second integrated power supply and power receiving module is connected to other power over Ethernet device, and is configured to receive electric power.

14. The power over Ethernet device as claimed in claim 1, wherein there are a plurality of network port modules; wherein the plurality of network port modules are configured to transmit electric power via the Ethernet cable for a plurality of powered devices.

15. The power over Ethernet device as claimed in claim 14, wherein the plurality of powered devices are power over Ethernet devices.

16. The power over Ethernet device as claimed in claim 1, wherein the power consumption module at least comprises a hot-swapping component, an one-time programmable memory component and a transistor component, and is configured to achieve protection control and current combining and paralleling by the hot-swapping component, the one-time programmable memory component and the transistor component.

* * * * *